United States Patent [19]

De Blok et al.

[11] Patent Number: 5,079,941

[45] Date of Patent: Jan. 14, 1992

[54] TEMPER MILL INSTALLATION AND SHEARING MACHINE FOR USE IN SUCH AN INSTALLATION

[75] Inventors: Jan F. De Blok, Beverwijk; Johannes C. Korver, Zuid-Scharwoude, both of Netherlands

[73] Assignee: Hoogovens Groep BV, Ijmuiden, Netherlands

[21] Appl. No.: 610,344

[22] Filed: Nov. 8, 1990

Related U.S. Application Data

[63] Continuation-in-part of Ser. No. 536,956, Jun. 12, 1990, abandoned, which is a continuation of Ser. No. 227,666, Aug. 2, 1988, abandoned.

[51] Int. Cl.$^5$ ............................................. B21B 1/28
[52] U.S. Cl. ........................................ 72/203; 30/292; 83/488; 83/563; 83/614
[58] Field of Search ............... 72/203, 204, 206, 229, 72/234; 30/240, 265, 276, 289, 292, 319; 83/60, 64, 156, 353, 370, 469, 485, 486, 487, 488, 492, 563, 614

[56] References Cited

U.S. PATENT DOCUMENTS

| | | | |
|---|---|---|---|
| 966,557 | 8/1910 | Jewell | 72/203 |
| 2,054,820 | 1/1935 | Hudson | 72/203 |
| 2,708,480 | 11/1953 | Engel | 83/488 |
| 3,292,402 | 12/1966 | O'Brien | 72/234 |
| 3,306,146 | 2/1967 | Reid et al. | 83/614 |
| 3,740,848 | 6/1973 | Lindley . | |
| 4,872,330 | 10/1989 | Nonini | 72/203 |

FOREIGN PATENT DOCUMENTS

| | | | |
|---|---|---|---|
| 0010309 | 1/1980 | Japan | 72/16 |
| 0102309 | 8/1981 | Japan | 72/16 |
| 0103712 | 6/1982 | Japan | 72/234 |
| 868867 | 5/1961 | United Kingdom . | |
| 934951 | 8/1963 | United Kingdom . | |
| 1200728 | 7/1970 | United Kingdom | 83/488 |

*Primary Examiner*—Lowell A. Larson
*Assistant Examiner*—Thomas C. Schoeffler
*Attorney, Agent, or Firm*—Stevens, Davis, Miller & Mosher

[57] ABSTRACT

A temper mill installation for steel strip has an uncoiler, a rolling mill for the strip, a shearing machine for cutting the strip to remove damaged turns at the end of a coil and a coiler for coiling the strip after rolling. To avoid wastage of sheet, the shearing machine has a movable shearing head and is positioned adjacent the strip path between the uncoiler and the rolling mill. The shearing head is movable across the strip path to effect cutting of the strip.

7 Claims, 2 Drawing Sheets

TEMPER MILL INSTALLATION AND SHEARING MACHINE FOR USE IN SUCH AN INSTALLATION

This application is a continuation-in-part of U.S. application Ser. No. 536,956 filed June 12, 1990, now abandoned, which was a continuation of U.S. application Ser. No. 227,666 filed Aug. 2, 1988, now abandoned.

BACKGROUND OF THE INVENTION

1. Field of the Invention

The invention relates to a temper mill installation having an uncoiler for coils of steel strip, a rolling mill for the steel strip, a shearing machine for cutting the steel strip and a coiler for the steel strip rolled by the mill. The invention also relates to a shearing machine for use in the temper mill installation. A temper mill may be a skin-pass mill. A use of such a mill is hardening, especially cold-hardening.

2. Description of the Prior Art

Temper mill installations of the type described above are known in rolling mill practice. The shearing machine used is usually equipped with guillotine shears. Because of the size of the known shearing machine it is customary to position it between the rolling mill and the coiler. However, this has the disadvantage, explained below, that for each coil worked in the temper mill installation a number of meters of steel strip cannot be treated, and are unnecessarily wasted.

The innermost turns of a coil, which is placed on the uncoiler, are generally damaged in such a way that to pass those turns through the rolling mill could result in damage to the mill rolls. Immediately before the damaged turns reach the rolling mill, the rolling process is therefore stopped. Then the quillotine shears positioned at the discharge end of the rolling mill are operated, after which coiling can be completed. The part of the strip which extends from the damaged turns on the entry side of the rolling mill to the position of the shearing machine is of good quality. Nevertheless, this part of the strip is separated from the coil of steel strip which has meanwhile been wound on the coiler, and must be treated as waste.

A further disadvantage of the known temper mill installation is that the strip remaining behind in the rolling mill still has to be removed. This is generally solved by causing the uncoiler after the shearing machine has operated, to coil up the uncoiled strip by reversing the direction of rotation of the uncoiler. This however reduces the production capacity of the temper mill installation and imposes extra requirements on the control of the uncoiler.

It is known from GB-A-868,867 to remove, by shearing, service tails from coiled metal strip, particularly strip which has been cold-rolled in a reversing mill, while uncoiling the strip for further treatment. This further treatment is in particular softening and descaling.

SUMMARY OF THE INVENTION

The invention is intended to overcome the above-mentioned disadvantages, and provide a temper mill installation in which waste of strip is minimized.

According to the invention, in the temper mill installation the shearing machine has a movable shearing head and is positioned between the uncoiler and the rolling mill, preferably close to the uncoiler and adjacent to the path of strip movement. The shearing head is moved to effect the shearing of the strip. In this way a satisfactory positioning of the shearing machine is achieved insofar as occupation of space is concerned. A coil of steel strip can be uncoiled as far as the damaged turns and rolled without losing good quality strip, since the strip is cut by the movable shearing head close to the damaged portion. Furthermore, it is no longer necessary to reverse the uncoiler.

The invention is applicable both to new and existing temper mill installations. On the entry side of the temper mill installation strip breakage occurs regularly which can cause damage to surrounding apparatus. This is a restriction on installing known guillotine shears on the entry side. The temper mill installation according to the invention permits the use of a shearing machine on the entry side, without the shearing machine being thereby exposed to the danger of damage.

Preferably the shearing machine has at least one movable beam extending perpendicularly to the movement direction of the steel strip. The shearing head is attached to this beam. In this arrangement it is possible to keep the shearing machine during rolling completely outside the movement path of the strip and in consequence no modifications are required to the feed part of an existing temper mill installation in order to introduce the new shearing machine.

It is advantageous for the shearing head to be movable relatively along the beam in the longitudinal direction of the beam. It is also preferable that at the start of cutting during normal use of the installation the shearing head is positioned at a first end of the beam. This first end lies closest to the strip movement path.

In view of the desirability of automating the entire process of uncoiling, rolling and coiling as far as possible, it is preferred that the parts of the installation should have defined positions. For this reason it is recommended that the said first end of the beam has means which, at least at the beginning of cutting, provide a resistance force to prevent relative movement of the shearing head along the beam. Preferably a friction brake is used for this purpose.

The beam and the shearing head carried by it must carry out a combined movement, such that the strip can be cut with sufficient speed. For this purpose both the beam and the shearing head may each have their own drive. However, it is particularly advantageous if the first end of the beam is fitted with a friction brake to restrain the shearing head. In this arrangement only the shearing elements, e.g. discs, need a drive and the shearing head as a whole does not require a separate drive system.

The shearing head is freely movable along a certain length of the extensible beam. Only in the initial position of the shearing head relative to the beam does contact exist between two friction pads, one of which is connected to the shearing head and the second of which is connected to the beam. When the beam is moved toward the strip, the shearing head follows as long as the force on the shearing head diametrically opposed to said movement is less than or equal to the resistance force between the friction pads. As soon as the opposing force is greater than the resistance force, which is the case after the shearing head makes contact with the strip, slip between the friction pads will occur, leading to the breaking of the synchronization between the translation of the beam and the shearing head. Since the maximum speed of the self propelling shearing head is less than the speed of the extending beam, this synchronization is only re-established after the shearing action is finished, when the beam is retracted and the friction pads come into contact again. The beam thus takes the shearing head back to its initial position. A shearing head with two interacting shearing discs cuts the strip at a speed which is dependent on the speed of rotation of the shearing discs.

The shearing discs operate such that they are propulsed through the steel strip by their own cutting motion. For satisfactory operation of the shearing machine it is also desirable that during normal use the beam moves at a speed higher than the speed at which the shearing head cuts the steel strip.

With a view to the desired automatic operation of the shearing machine it is preferable that the shearing head has an inductive element for detecting the presence of the steel strip. If during the cutting the absence of steel strip is detected, the cutting is terminated and the shearing machine is moved back to its starting position.

The invention also relates to a shearing machine suitable for use in a temper mill installation according to the invention, said shearing machine having a movable shearing head, a beam movable in it, longitudinal direction on which said shearing head is mounted so as to be movable along the beam and means for holding the shearing head in an initial position on the beam.

BRIEF INTRODUCTION OF THE DRAWINGS

A preferred embodiment of the invention will now be described in detail by way of non-limitative example with reference to the drawings, in which.

The same reference numbers in the two figures refer to the same components.

Figure 1:
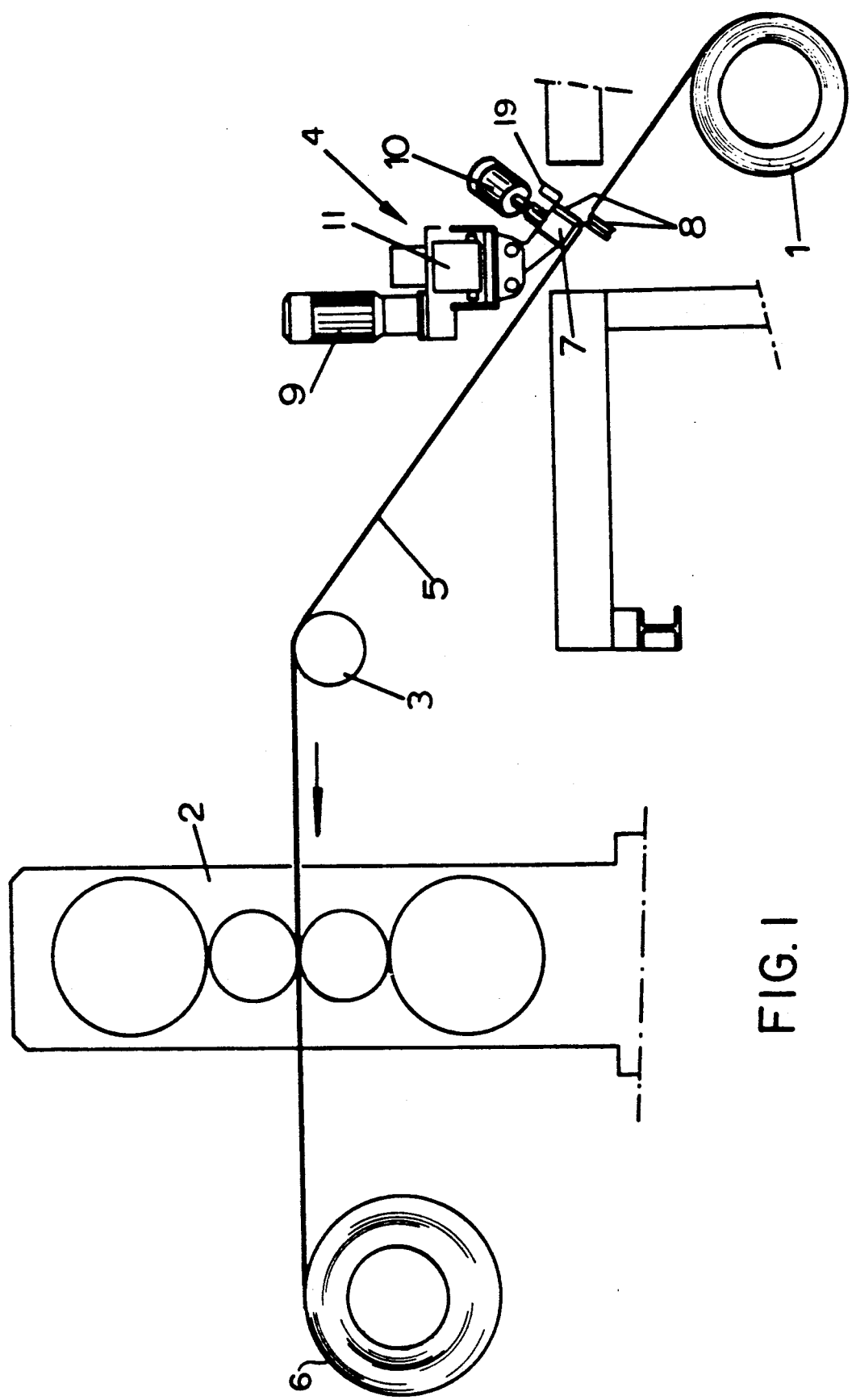
FIG. 1 shows a temper mill installation embodying the invention in side view.

FIG. 1 shows a coil of steel strip placed on an uncoiler 1 from which the steel strip 5 is passed over a direction-changing roller 3 to a rolling mill 2. A coiler 6 is positioned beyond the rolling mill 2 to coil up the finished steel strip. This is as so far described a conventional temper mill installation and need not be described further. In accordance with the invention, a shearing machine 4 is arranged close to the uncoiler 1 and in use is operated just before the last turns leave the uncoiler 1. The shearing machine 4 then cuts off the last, usually damaged turns from the part of the strip which is of good quality.

Figure 2:
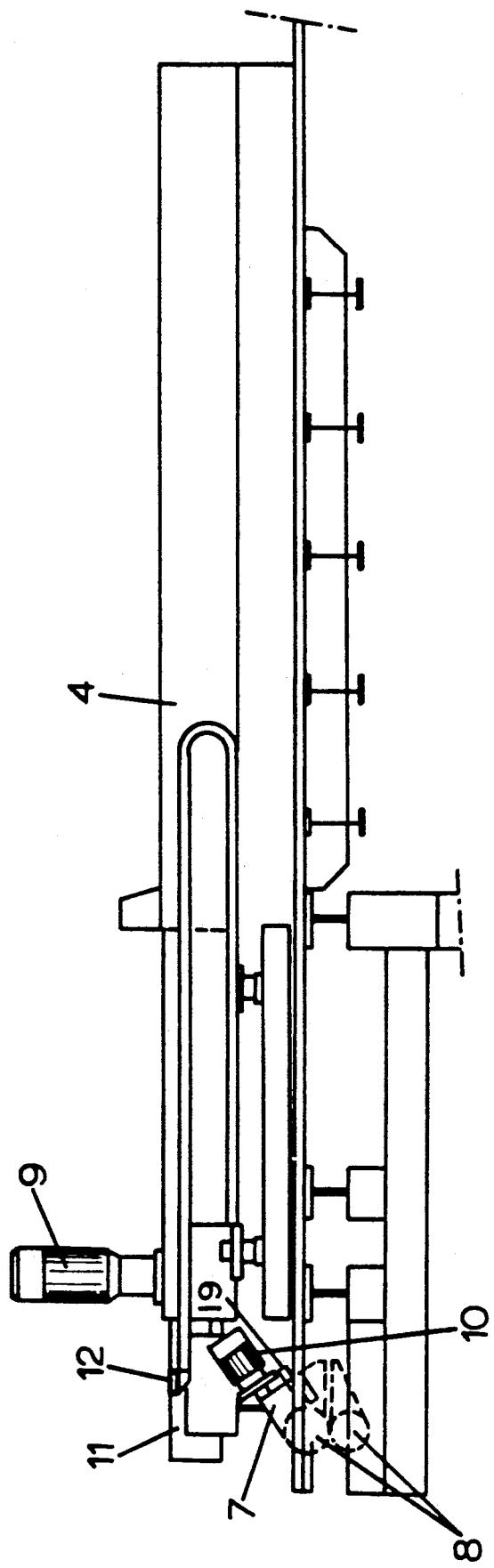
FIG. 2 shows a shearing machine embodying the invention in side view.

Details of the shearing machine are shown in FIG. 2, which illustrates the starting position of the shearing machine 4 before a cutting operation. The shearing machine 4 is then in its entirety next to the path of strip transport (which is at the left-hand side of FIG. 2). The shearing machine has a beam 11 which extends perpendicularly to the movement direction of the strip and is movable, under the action of a motor 9, perpendicularly above the strip. Mounted on the beam 11 and movable along it is a shearing head 7 comprising cooperating shearing discs 8 for cutting the steel strip and a drive motor 10 for the discs 8. A friction brake 12 provides a resistance force holding the shearing head 7 at its predetermined starting position at the end of the beam 11 closest to the strip path. This brake 12 is released when a cutting operation takes place.

When a shearing operation is required, the drive motor 9 is started up so that the beam 11 is moved in the direction of the strip. The shearing head 7 is mounted on the beam 11 at a height such that the strip passes precisely in the gap between the two shearing discs 8. The shearing discs 8 are driven by the drive motor 10. Until the moment that the strip comes into the gap between the shearing discs 8 the shearing head 7 is held firmly on the beam 11 by the friction brake 12.

The speed of displacement of the beam 11 is however greater than the speed with which the shearing discs 8 cut the strip. Hence the shearing head 7 is released by the friction brake 12 and moves freely along the beam 11. Also included in the shearing head 7 is an inductive element 19 by which the presence of steel strip 5 in the shearing head 7 is detected. When the shearing head 7 has cut the strip over its entire width, the inductive element 19 detects the absence of the strip, whereupon the control of the shearing machine ensures that the beam 11 is moved back to its starting position as shown in FIG. 2.

What is claimed is:

1. Temper mill installation for steel strip having an uncoiler for a coil of steel strip, a shearing machine for cutting the steel strip immediately downstream of a uncoiler to prevent loss of strip except for last damaged turns of the coil, a rolling mill for the steel strip and a coiler for coiling the steel strip after rolling by the rolling mill, wherein the strip moves in a path from the uncoiler through the rolling mill to the coiler, said shearing machine having a movable shearing head and being positioned adjacent the strip path between the uncoiler and the rolling mill but outside of the strip path, said shearing head being movable across the strip path to effect cutting of the strip and said shearing machine having at least one movable beam extending perpendicular to the movement direction of the strip in said path and movable perpendicularly to said movement direction of the strip, said shearing head being attached to this beam.

2. The temper mill installation according to claim 1, wherein the shearing head is movable along the beam in the longitudinal direction of the beam.

3. The temper mill installation according to claim 1, wherein, at the beginning of cutting of the strip during normal operation of the shearing machine, the shearing head is positioned at a first end of the beam.

4. The temper mill installation according to claim 3 wherein said first end of the beam is provided with means for preventing, at least at the start of cutting, movement of the shearing head along the beam.

5. The temper mill installation according to claim 4 wherein said preventing means is a friction brake.

6. The temper mill installation according to claim 1 wherein during normal operation the beam moves perpendicularly to the direction of movement of the strip at a speed greater than the speed at which the shearing head cuts the strip.

7. Temper mill installation for steel strip having an uncoiler for a coil of steel strip, a shearing machine for cutting the steel strip immediately downstream of a uncoiler to prevent loss of strip except for last damaged turns of the coil, a rolling mill for the steel strip and a coiler for coiling the steel strip after rolling by the rolling mill, wherein te strip moves in a path from the uncoiler through the rolling mill to the coiler, said shearing machine having a movable shearing head and being positioned adjacent the strip path between the uncoiler and the rolling mill but outside of the strip path, said shearing head being movable across the strip path to effect cutting of the strip and said shearing machine having a beam movable in its longitudinal direction on which said shearing head is mounted so as to be movable in the longitudinal direction of the beam, and means for providing a resistance force holding the shearing head in an initial position on said beam.

* * * * *